United States Patent
Sergeev et al.

(10) Patent No.: US 9,954,693 B2
(45) Date of Patent: Apr. 24, 2018

(54) SYSTEM AND METHOD OF ASSESSING LATENCY OF FORWARDING DATA PACKETS IN VIRTUAL ENVIRONMENT

(71) Applicant: ADVA Optical Networking SE, Martensreid/Munich (DE)

(72) Inventors: Andrew Sergeev, Kfar Saba (IL); Yossi Meir, Petah Tikva (IL); Shlomo Reches, Petah Tikva (IL); Samuel Monderer, Petah Tikva (IL)

(73) Assignee: ADVA Optical Networking SE, Martensreid/Munich (DE)

( * ) Notice: Subject to any disclaimer, the term of this patent is extended or adjusted under 35 U.S.C. 154(b) by 72 days.

(21) Appl. No.: 15/285,899

(22) Filed: Oct. 5, 2016

(65) Prior Publication Data

US 2017/0104608 A1    Apr. 13, 2017

(30) Foreign Application Priority Data

Oct. 8, 2015 (EP) .................................... 15189021

(51) Int. Cl.
*H04L 12/46* (2006.01)
*H04L 12/935* (2013.01)
(Continued)

(52) U.S. Cl.
CPC ...... *H04L 12/4641* (2013.01); *H04L 49/3009* (2013.01); *G06F 11/301* (2013.01);
(Continued)

(58) Field of Classification Search
CPC ... H04L 12/46; H04L 12/935; H04L 12/4641; H04L 49/3009; H04L 49/3045;
(Continued)

(56) References Cited

U.S. PATENT DOCUMENTS 6,185,188 B1 *  2/2001  Hasegawa ............. H04L 47/562
                                                          370/235
6,868,069 B2    3/2005  Knobbe et al.
(Continued)

FOREIGN PATENT DOCUMENTS

EP      2247080       11/2010
WO      WO2015126430   2/2014
WO      WO2015105684   7/2015

OTHER PUBLICATIONS

Kompella, R. R., Levchenko, K., Snoeren, A. C., & Varghese, G., Every microsecond counts: tracking fine-grain latencies with a lossy difference aggregator, Journal, ACM SIGCOMM Computer Communication Review, Aug. 2009, vol. 39, No. 4, pp. 255-266, ACM.
(Continued)

*Primary Examiner* — Warner Wong
(74) *Attorney, Agent, or Firm* — Wiggin and Dana LLP; Gregory S. Rosenblatt; Andrew D. Bochner (57) ABSTRACT

There are provided a system and method of assessing latency of forwarding data packets in virtual environment. The method comprises: generating packet signatures $SG_D$ and $SG_A$ respectively for departing and arriving data packets; maintaining a first data structure comprising records related to departing packets associated with a first virtual function (VF), each record informative of $SG_D$ and registered departure time $T_D$ of a given departing packet; responsive to registering arriving time $T_A$ of a given monitored arriving packet $SG_A$ associated with a second VF, searching the first data structure for a record matching a matching condition $SG_D = SG_A$; modifying the matching record to become informative of latency $\Delta T = T_A - T_D$ and adding the modified record to a second data structure; and using data in
(Continued)

the second data structure for assessing latency of forwarding packets from the ingress virtual port to the egress virtual port.

20 Claims, 7 Drawing Sheets

(51) Int. Cl.
*H04L 12/835* (2013.01)
*H04L 29/12* (2006.01)
*G06F 11/30* (2006.01)
*H04L 7/00* (2006.01)

(52) U.S. Cl.
CPC ............ *G06F 11/3003* (2013.01); *H04L 7/00* (2013.01); *H04L 47/30* (2013.01); *H04L 49/3045* (2013.01); *H04L 61/1552* (2013.01)

(58) Field of Classification Search
CPC ....... H04L 49/354; H04L 49/70; H04L 49/90; H04L 49/9005; H04L 1/0018; H04L 1/1874; H04L 1/1835; H04L 2012/5617; H04L 2012/5621; H04L 2012/5681; H04L 2012/6489; H04L 45/00; H04L 45/586; H04L 29/06612; H04L 29/06684; H04L 47/30; H04L 47/32; H04L 47/50; H04L 61/1552; H04L 7/00; H04L 7/0041; H04L 43/00; H04L 43/0858; H04L 63/1408; H04L 63/0272; G06F 11/00; G06F 11/0712; G06F 11/30; G06F 11/3003; G06F 11/301; G06F 11/3055; G06F 11/3058; G06F 11/3065; G06F 11/3096
See application file for complete search history.

(56) References Cited

U.S. PATENT DOCUMENTS

| | | | | |
|---|---|---|---|---|
| 7,969,901 | B2* | 6/2011 | Degenhardt | H04L 1/1887 |
| | | | | 370/252 |
| 8,228,923 | B1* | 7/2012 | Jain | H04J 3/0682 |
| | | | | 370/350 |
| 8,811,410 | B1 | 8/2014 | Jain et al. | |
| 9,094,307 | B1* | 7/2015 | Edsall | H04L 43/028 |
| 2012/0155467 | A1* | 6/2012 | Appenzeller | H04L 45/54 |
| | | | | 370/392 |
| 2013/0346592 | A1* | 12/2013 | Kamble | H04L 12/4633 |
| | | | | 709/224 |
| 2014/0317261 | A1 | 10/2014 | Shatzkamer et al. | |
| 2014/0376555 | A1* | 12/2014 | Choi | H04L 45/66 |
| | | | | 370/395.53 |
| 2015/0082308 | A1 | 3/2015 | Kiess et al. | |
| 2015/0142940 | A1 | 5/2015 | McMurry et al. | |
| 2015/0244617 | A1* | 8/2015 | Nakil | G06F 9/45558 |
| | | | | 709/224 |
| 2016/0112182 | A1* | 4/2016 | Karnes | H04J 3/0697 |
| | | | | 375/362 |
| 2018/0013675 | A1* | 1/2018 | Nellikar | G06F 9/45558 |

OTHER PUBLICATIONS

6. Ohta, S., & Miyazaki, T., Passive Packet Loss Monitoring That Em-Ploys the Hash-Based Identification Technique, Symposium, Ninth IFIP/IEEE International Symposium on Integrated Network Management, 2005.

* cited by examiner

SYSTEM AND METHOD OF ASSESSING LATENCY OF FORWARDING DATA PACKETS IN VIRTUAL ENVIRONMENT

TECHNICAL FIELD

The presently disclosed subject matter relates to virtualization of telecommunications services and, more particularly, to managing network function virtualization (NFV) in communication networks.

BACKGROUND

Traditionally, network functions (e.g. firewalls, Load Balancers, Deep Packet Inspectors, Network Address Translators, etc.) have been provided as Physical Network Functions (PNFs) on dedicated hardware appliances that typically require physical installation at each site where such PNFs are needed.

Network Functions Virtualization is an emerging approach to transform network functions (NFs) previously performed via proprietary hardware appliances into Virtual Network Functions (VNFs). A network function (NF) is a functional building block within a network infrastructure, which has well-defined external interfaces and a well-defined functional behavior. In accordance with Network Functions Virtualization approach, NFs can be implemented as application software which can be run on a range of standardized, high-volume servers, switches, and/or storage that can be located, for example, in datacenters, network nodes, end user premises, etc.

Virtualization of NFs enables a standardized execution for VNFs and sharing of physical hardware by multiple VNFs. Implementing of Virtual Network Function decouples the software implementation of the network function from the infrastructure resources it runs on. Thereby, NF virtualization enables a much more flexible and dynamic network than a legacy communication network.

Architecture of telecom services based on Network Function Virtualization (NFV) is detailed, for example, in a series of documents published by the European Telecommunications Standards Institute (ETSI).

Problems of managing services in NF Virtualized networks have been recognized in the conventional art and various techniques have been developed to provide solutions, for example:

US Patent Application No. 2014/0317261 discloses a method of defining interdependent virtualized network functions for service level orchestration. The method can comprise: identifying, by an orchestrator executed by a physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and setting by the orchestrator an interdependency indicator within each virtualized container based on association with the virtualized network service, enabling identification of each of the virtualized network functions as interdependent for coordinated execution of the virtualized network service.

International Patent Application No. WO15/126430 discloses a method of managing virtual network functions for a network. The method includes providing a virtual network function (VNF) including a number of virtual network function components (VNFCs) of a number of different types, each VNFC comprising a virtual machine (VM) executing application software. The method further includes creating for up to all VNFC types a number of deactivated VMs having application software, monitoring at least one performance level of the VNF, and scaling-out the VNF by activating a number of deactivated VMs of a number of VNFC types when the at least one performance level reaches a scale-out threshold.

US Patent Application No. 2015/0082308 discloses a method for implementing an entity of a network by virtualizing the network entity and implementing it on one or more servers each acting as an execution unit for executing thereon one or more applications running and/or one or more virtual machines running on the execution unit. Each of the application programs or virtual machines running on a server and implementing at least a part of the functionality of the network entity being called a virtual network function VNF module, wherein a plurality of the VNF modules together implement the network entity to thereby form a virtual network function VNF. The method comprises: obtaining m key performance indicators (KPI) specifying the required overall performance of the VNF, obtaining n performance characteristics for available types of execution units, determining one or more possible deployment plans based on the obtained m KPI and n performance characteristics, each deployment plan specifying the number and types of execution units, such that the joint performance of VNF modules running on these execution units achieves the required overall performance of the VNF.

US Patent Application No. 2015/0142940 discloses a technique for analyzing virtualization-related information related to a telecommunications network for managing network virtualization. A system for analyzing virtualization-related information can include an information concentrator. The information concentrator can include a first interface for receiving the virtualization related information and an analysis engine for collecting and analyzing the received information, for determining a set of network virtualization related data based on the information, and for directing the network virtualization related data set to a node for making virtualization decisions.

The references cited above teach background information that may be applicable to the presently disclosed subject matter. Therefore the full contents of these publications are incorporated by reference herein where appropriate for appropriate teachings of additional or alternative details, features and/or technical background.

General Description

In accordance with certain aspects of the presently disclosed subject matter, there is provided a method of assessing latency of forwarding data packets in virtual environment. The method comprises: upon specifying a transmitting monitoring point associated with a first virtual function (VF) corresponding to an ingress virtual port of a virtualized platform (VP) running on the computing platform and a receiving monitoring point associated with a second VF corresponding to an egress virtual port of a virtualized platform (VP) running on the computing platform, generating packet signatures (SGs) for at least part of data packets eligible for monitoring, thus giving rise to monitored departing packets, each uniquely characterized by respective departing packet signature SGD and to monitored arriving packets each uniquely characterized by respective arriving packet signature SGA. The method further comprises: maintaining a first data structure comprising a plurality of records related to monitored departing packets associated with the first VF, each record among the plurality of records further informative of, at least, SGD and registered departure time TD of a given departing packet, wherein departure time TD is indicative of departure time of the given departing packet from the first monitoring point Tx; responsive to registering arriving time TA of a given monitored arriving packet SGA associated with the second VF, searching the first data structure for a record matching a matching condition, wherein the matching condition at least comprises requirement that SGD=SGA, and wherein arriving time TA is indicative of arriving time of the given arriving packet at the receiving monitoring point; modifying the matching record, when found, to become informative of latency $\Delta T=TA-TD$ and adding the modified matching record to a second data structure storing one or more modified records, each informative of latency measured for forwarding a respective packet from the first monitoring point to the receiving monitoring point; and enabling using data in the second data structure for assessing latency of forwarding packets from the ingress virtual port to the egress virtual port of the virtualized platform.

By way of non-limiting example, Virtualized Platform can be a virtual machine, a virtualized container, a group of virtual machines and/or virtualized containers, a chain of virtual machines and/or virtualized containers.

The matching condition can further comprise a requirement that the given departing packet has departed from the transmitting monitoring point associated with a predefined first VF while the given arriving packet has arrived at the receiving monitoring point associated with a predefined second VF.

The method can further comprise: identifying all VPs involved in data processing related to a certain virtual network function (VNF); specifying the transmitting and receiving monitoring points in accordance with identified VPs; and assessing VNF latency-related characteristics using latencies assessed for forwarding packets from the ingress virtual port to the egress virtual port of each of the involved VP.

In accordance with other aspects of the presently disclosed subject matter, there is provided a network interface module operative in data communication with a computer configured to run at least one VP, the module being capable of providing I/O virtualization for the at least one VP and being configured to perform the method of assessing latency of forwarding data packets in virtual environment as disclosed above.

In accordance with other aspects of the presently disclosed subject matter, there is provided a computing platform comprising a computer configured to run at least one VP and a network interface module configured to provide I/O virtualization for the at least one VP, the module being further configured to perform the method of assessing latency of forwarding data packets in virtual environment as disclosed above.

In accordance with other aspects of the presently disclosed subject matter, there is provided a computing platform comprising a computer configured to run at least one VP, a network interface card (NIC) configured to provide I/O virtualization for the at least one VP and a latency measurement module operatively connected to the NIC and being configured to perform the method of assessing latency of forwarding data packets in virtual environment as disclosed above.

In accordance with other aspects of the presently disclosed subject matter, there is provided computer program product implemented on a non-transitory computer usable medium having computer readable program code embodied therein to cause the computer to perform the method of assessing latency of forwarding data packets in virtual environment as disclosed above.

In accordance with further aspects and, optionally, in a combination with other aspects of the presently disclosed subject matter, the records in the first data structure can further comprise data derived from transport headers of respective departing packets and/or data derived by deep packet inspection. The records in the second data structure further can comprise data derived from transport headers of respective departing packets and/or data derived by deep packet inspection. Optionally, latency can be assessed in consideration of data derived from transport headers of respective departing packets and/or data derived by deep packet inspection.

In accordance with further aspects and, optionally, in a combination with other aspects of the presently disclosed subject matter, the monitoring points can be specified as a pair constituted by the transmitting monitoring point associated with a predefined first VF and the receiving monitoring point associated with any second VF. Alternatively, the monitoring points can be specified as a pair constituted by the transmitting monitoring point associated with a predefined first VF and the receiving monitoring point associated with a predefined second VF.

Optionally, the ingress virtual port and the egress virtual port can correspond to ingress and egress directions of the same virtual port, and the first virtual function and the second virtual function correspond to ingress and egress directions of the same virtual function.

In accordance with further aspects and, optionally, in a combination with other aspects of the presently disclosed subject matter, all arriving packets can be configured as eligible for monitoring.

In accordance with further aspects and, optionally, in a combination with other aspects of the presently disclosed subject matter, only part of the departing packets can be configured as eligible for monitoring, the part is defined by a predefined downscale ratio. Additionally or alternatively, only departing packets associated with a predefined traffic protocol can be configured as eligible for monitoring.

Among advantages of certain embodiments of presently disclosed subject matter is capability of latency assessment for services, virtual network functions and/or components thereof based on real-time passive measurement, without a need for test traffic insertion.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, host platform and respective parts thereof disclosed in the present application.

It is to be understood that the term "non-transitory memory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
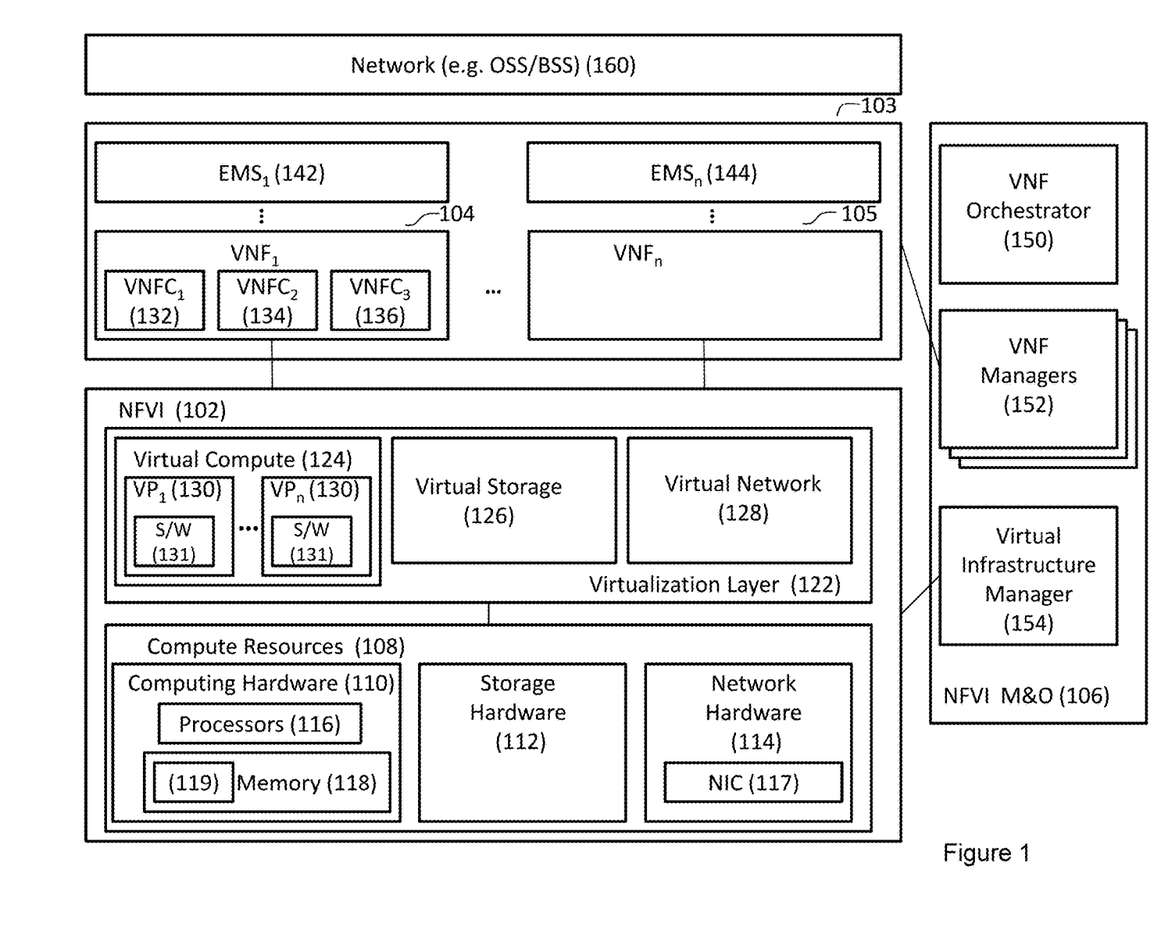
FIG. 1 illustrates a generalized schematic architecture of an exemplified NFV framework in which certain embodiments of the presently disclosed subject matter can be implemented.

Bearing this in mind, attention is drawn to FIG. 1 illustrating a generalized schematic architecture of an exemplified NFV framework in which certain embodiments of the presently disclosed subject matter can be implemented. The illustrated architectural framework includes a Network Functions Virtualization Infrastructure (NFVI) 102, a number of Virtualized Network Functions (VNF) 103, and NFV Management and Orchestration function (NFV M&O) 106.

NFVI 102 provides resources required to support the execution of VNFs, and includes compute resources 108. Compute resources 108 can include computing hardware 110 (including processors 116 and memory 118), storage hardware 112, and network hardware 114. The NFV-Infrastructure can span across several locations, and the network providing connectivity between these locations can be regarded as part of the NFV-Infrastructure.

NFVI 102 further includes a virtualization layer 122 configured to provide virtualization of the underlying compute resources 108. Virtualization layer 122 includes a virtual computing component 124, a virtual storage component 126, and a virtual network component 128. Virtual computing component 124 includes a number of virtualized platforms VPs 130 (indicated as $VP_1$ through $VP_n$), wherein individual VPs can be of different types (e.g. be constituted by one or more virtual machines, one or more virtualized containers (e.g. Docker), chains of virtual machines and/or virtualized containers, etc.). A Virtualized Platform Manager (VPM) 119 can reside on computing hardware 110 and manage VPs 130.

A virtual machine (VM) is a software implementation of a machine (i.e. a computer) that executes programs like a physical machine. One or more Virtual Machines (VMs) can operate on a single physical computing system (also referred to as a host), while each VM operates substantially independently of its peers. For example, each VM can have its own memory space on the physical computing system, and can implement its own Operating System (OS) and associated programs. Sharing of physical resources between VMs is performed by a Virtual Machine Manager (VMM) (also referred to as a hypervisor), which implements a hardware abstraction layer between the VMs and the physical resources of the system. The VMM can, inter alia, set up initial memory spaces for each VM, boot each VM onto the physical computing system, etc. The VMM can be configured to prioritize, queue, or otherwise manage the order and manner in which I/O for the VMs is processed by the resources of the physical computing system.

Virtualized containers are another example of virtualized platform. A virtualized container includes a respective application and all of its dependencies, but shares the kernel with other virtualized containers. Virtualized containers run as an isolated process in user space on the host operating system (e.g. see https://www.docker.com/whatisdocker).

Further to virtualization of processing and memory resources, I/O operations can also be virtualized so that a single I/O hardware device (e.g. Network Interface Card 118 or port thereof) can be shared between multiple VPs.

VNFs 103 represents the software implementation of one or more network functions (illustrated as $VNF_1$ (104) to $VNF_N$ (105)) which are capable of miming over NFVI 102. Each VNF can include one or more virtual network function components (VNFCs). As illustrated, $VNF_1$ 104 includes VNFCs illustrated as $VNFC_1$ 132, $VNFC_2$ 134 and $VNFC_3$ 136, each VNFC comprises a VP executing application software 131 being executed by one of VPs 130, wherein each VP 130 executing application software 131 forms a different VNFC. By way of non-limiting example, $VNFC_1$, $VNFC_2$ and $VNFC_3$ can be each of a different VNFC type, with each VNFC type providing different functionality to VNF 104. Although illustrated with respect to VNF 104, all VNFs can be structured in a similar fashion and include different numbers of VPs and VMFCs.

VNFs enable the capacity of a network function to be adjusted more quickly than NFs provided by physical hardware appliances. For example, when increased capacity is required for a VNF, a network operator, via a user interface or by automated processes, communicates with and instructs the VPM to create new VPs, with each VP running application software and forming one of the VNFCs of the VNF.

Each VNF can be operatively coupled to Element Management System (illustrated as $EMS_1$ (142) and $EMS_n$ (144)) configured to provide monitoring and management of corresponding VNF.

NFV M&O 106 is configured to orchestrate and manage physical and/or software resources that support the infrastructure virtualization and management of the VNFs. NFV M&O is also configured to interact with the external systems (e.g. OSS/BSS 160), which enables NFV to be integrated into network-wide management landscape. NFV M&O 106 comprises NFV Orchestrator 150, VNF Managers 152, and virtual infrastructure manager (VIM) 154.

By way of non-limiting example, NFV Orchestrator 150, via VIM 154, can direct VPM 119 to create a number of VPs for a number of VNFCs of VNF 104, and to load application software onto each VP such that, when executed by the VP, the VP forms the corresponding VNFC.

VNF Manager 152 is configured to track all VPs, VNFCs and functions of a particular VNF (e.g. VNF 104), and can be provided by the vendor providing the VNF. NFV Orchestrator 150 tracks all VNFs operating on the network, the types of each VNFC and the number of VPs of each VNFC type, the performance of all VNFs, hardware resources assigned to each VNF, and hardware resources which are available for assignment.

The NFV network architecture detailed with reference to FIG. 1 corresponds to architectural framework developed and described by the Network Functions Virtualization Industry Specification Group (NFV ISG) of the European Telecommunications Standards Institute (ETSI). Those versed in the art will readily appreciate that the teachings of the presently disclosed subject matter are not bound by the NFV network architecture illustrated in FIG. 1; equivalent and/or modified functionality can be consolidated or divided in another manner and can be implemented in any appropriate combination of software with appropriate firmware and/or hardware.

For purpose of illustration only, the following description is provided for a Virtual Machine (VM) as a virtualized platform and for Virtual Machine Manager (VMM). Those skilled in the art will readily appreciate that the teachings of the presently disclosed subject matter are, likewise, applicable any other suitable virtualized platform including virtualized containers, chains of virtual machines and/or virtualized containers or any other packet-forwarding applications running on a host computer and operable with virtualized I/O interfaces.

Figure 2A:
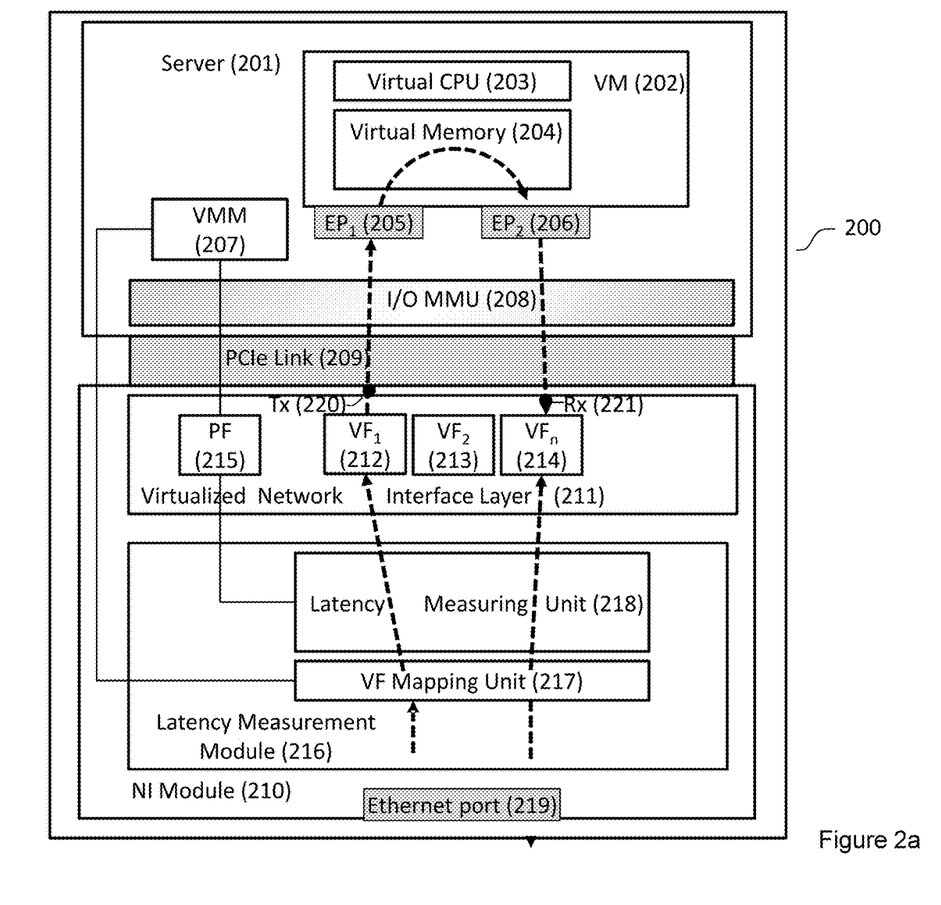
FIG. 2a illustrates a functional block diagram of a host platform configured in accordance with certain embodiments of the presently disclosed subject matter.

Referring to FIG. 2a, there is illustrated a functional block diagram of a hosting platform (e.g. being a part of NFVI 102) and configured in accordance with certain embodiments of the presently disclosed subject matter. The hosting platform 200 comprises a computing module 201 and a network interface module (NIM) 210 with at least one physical I/O port 219. The computing module includes a processor (not shown) and a memory (not shown) with a virtual machine manager (VMM) 207 and I/O memory management unit (I/O MMU) 208 running thereon. The computing module 201 is operatively coupled to the network interface module 210 via a PCIe (Peripheral Component Interconnect Express) link 209. The hosting platform 200 provides hosting to at least one virtual machine (VM) 202 comprising a virtual processor 203 and virtual memory 204. In addition to virtualization of processing and memory resources, the hosting platform 200 provides the hosted VM(s) with I/O virtualization enabled by virtualized network interface layer 211 comprised in NIM 210.

By way of non-limiting example, virtualized network interface layer 211 can operate in accordance with Single Root I/O Virtualization (SR-IOV) defined by PCI-SIG specification. SR-IOV defines a method of splitting an I/O device into multiple PCI Express Requester IDs (referred to as virtual functions) in a fashion that allows an I/O MMU to distinguish different traffic streams, apply memory and interrupt translations so that these traffic streams can be delivered directly to the appropriate Virtual Machine (VM), and in a way that prevents non-privileged traffic flows from impacting other VMs.

SR-IOV enables network traffic to bypass the VMM and the virtual function can be assigned directly to the VM. Each PCI Express virtual function (VF) can be directly assigned to a Virtual Machine (VM), several VF functions can be assigned to the same VM. All data packets can flow directly between a given VM memory area and the VF(s) assigned to this VM; each VM is provided by an independent memory space, interrupts and DMA (Direct Memory Access). Frames are sent to the external network via the physical port (e.g. port 222) or to another VM via the internal port (not shown) connected to the VF.

The VFs can be configured and assigned to particular VMs with the help of VMM 207, and be exposed to particular VMs as hardware devices. By way of non-limiting example, a given VF can be configured to correspond to predefined VLAN(s), MPLS label(s), a certain type of traffic (e.g. TCP traffic), etc. In accordance with certain embodiments of the currently disclosed subject matter, a given VF can correspond to a virtual network function (VNF) or a component thereof (VNFC) detailed with reference to FIG. 1. Data indicative of VFs configuration can be stored in the memory of computing module 201 in a VF configuration data structure (not shown).

Virtualized network interface layer 211 is configured to use SR-IOV to implement physical function (PF) 215 and one or more virtual functions (illustrated as 212-214).

It is noted that the teachings of the presently disclosed subject matter are not bound by the I/O virtualization based on SR-IOV by PCI-SIG and, likewise, can be applicable to other techniques of I/O virtualization with data path bypassing VMM (e.g. PCI pass-through to VM, MR-IOV, etc.).

PF 215 can be a hardware circuitry acting as a standard I/O interface. PF 215 can communicate with a physical function driver (not shown) of VMM 207. PF 215 can also have access to hardware registers that implement the full PCI configuration space for NIM 210.

The VMM 207 assigns one or more VFs to a VM by mapping configuration space registers of the VFs to the configuration space presented to the VM by the VMM. Virtualized network interface layer is further capable to provide configurable numbers of independent VFs, each with its own PCIe configuration space.

The illustrated VM 202 communicates with assigned to it $VF_1$ 212 via a virtual Ethernet port 205 and with assigned $VF_2$ 213 via a virtual Ethernet port 206. As illustrated by data path 225 (dashed line), VM 202 is configured to forward data packets received via virtual Ethernet port 205 to virtual Ethernet port 206. A port operating in ingress direction is referred to hereinafter as an ingress port, and a port operating in egress direction is referred to hereinafter as an egress port. Depending on a given data path, ingress port and egress port can correspond to ingress and egress directions of the same port or of different ports (as ports 205 and 206 illustrated in FIG. 2a). The assigned virtual functions $VF_1$ and $VF_2$ receive respective I/O from VM 202 and act as independent virtual ports of NIM 210. The respective data path bypasses VMM 207, providing VM 202 with direct access to the VFs 212 and 213.

I/O virtualization, whilst it eliminates involvement of the VMM in a data path, results in improved I/O throughput, reduced CPU utilization, lower latency, and improved scalability. However, together with it, VMM becomes unaware of performance characteristics (e.g. latency-related characteristics) of the data path. In accordance with certain embodiments of the presently disclosed subject matter, NI module 210 further comprises a latency measurement module 216 configured to measure latency in I/O virtualized data paths and report the respective results to VMM 207. Among advantages of certain embodiments of the presently disclosed subject matter is capability to enable monitoring latency-related characteristics in a case of virtualized I/O. As virtualized networks are characterized by reduced controllability of physical buffers and queues, monitoring latency-related characteristics can prevent misbehavior of VNF software.

Latency measurement module 216 comprises VF mapping unit 217 and latency measuring unit 218 further detailed with reference to FIGS. 3-5.

VF mapping unit 217 is configured to map data packets received via Ethernet port 219 in accordance with VF configuration defined in the VF configuration data structure. Mapping includes associating a given packet with data indicative of VF configured to handle the given packet (such data is referred to hereinafter as VF indicator). When VF mapping unit is unable to map a received data packet to a respective VF, (e.g. because of missing respective data in the VF configuration data structure, because of certain requirements in VF configuration data structure, etc.), mapping unit forwards such a packet to PF215 or discards it.

In the embodiments illustrated in FIG. 2a, capabilities of VF mapping unit 217 are shared by virtualized network interface layer 211 integrated with latency measurement module 216 in a single physical NIC (network interface card). In such a case, VF indicators provided by VF mapping unit 217 are usable by both latency measuring unit 218 and virtualized network interface layer 211 and are not transmitted over PCIe link.

Figure 2B:
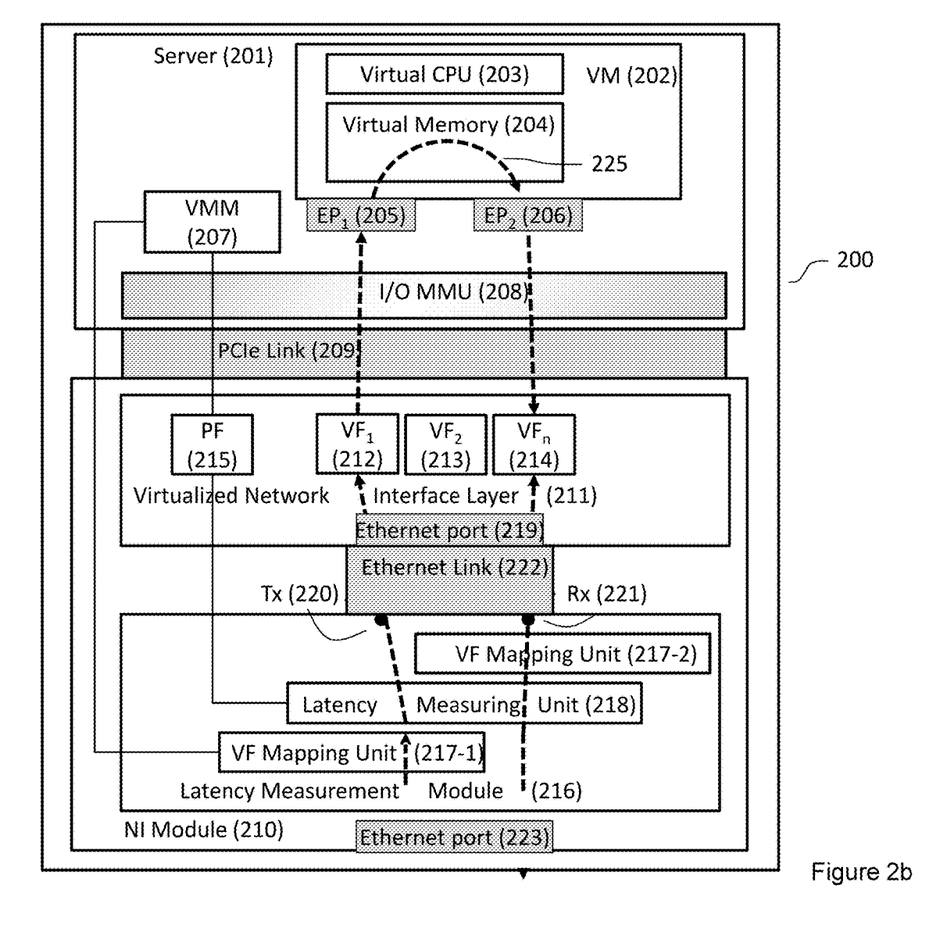
FIG. 2b illustrates a functional block diagram of a host platform configured in accordance with certain alternative embodiments of the presently disclosed subject matter.

Referring to FIG. 2b, there are illustrated alternative embodiments of the hosting platform 200, wherein the network interface module 210 comprises virtualized network interface layer 211 connected via Ethernet link 222 to latency measurement module 216 implemented in a separate hardware. In such a case, VF indicators provided by VF mapping unit 217 (217-1 for packets received via Ethernet port 223 and 217-2 for packets received via Ethernet link 222) are usable by latency measuring unit 218 and are not transmitted via Ethernet link 222. The virtualized network interface layer 211 also comprises VF mapping unit (not shown) usable for forwarding I/O virtualized traffic between Ethernet port 219 and PCIe link.

Monitoring points $T_x$ (220) and $R_x$ (221) shall be located in data path as close as possible to VM 202. In a case of embodiments illustrated with reference to FIG. 2a, $T_x$ (220) and $R_x$ (221) can correspond to termination points of PCIe link (209) in PHY (physical layer) of Virtualized Network Interface Layer (211); and in a case of embodiments illustrated with reference to FIG. 2b, $T_x$ (220) and $R_x$ (221) can correspond to termination points of Ethernet link (222) in PHY of latency measurement module (216). Latency measured between the monitoring points $T_x$ (220) and $R_x$ (221) is indicative of latency of VM forwarding from ingress to egress virtual ports.

Figure 3:
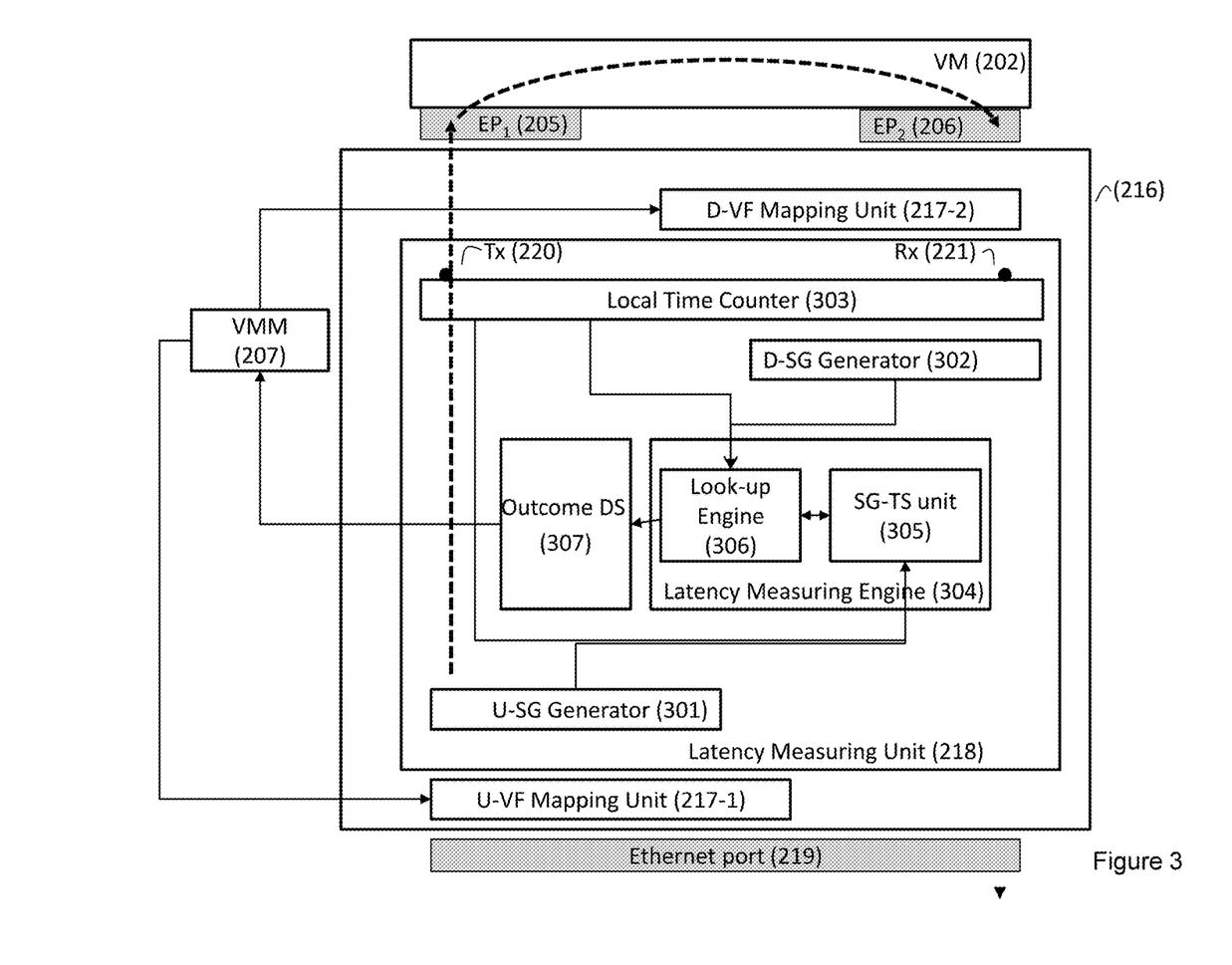
FIG. 3 illustrates a functional block diagram of a latency measurement module configured in accordance with certain embodiments of the presently disclosed subject matter.

Referring to FIG. 3, there is illustrated a functional block diagram of a latency measurement module configured in accordance with certain embodiments of the presently disclosed subject matter.

Latency measurement module 216 comprises VF mapping unit 217 and latency measuring unit 218. Data packets flowing through the latency measurement module to VM(s) are referred to hereinafter as "departing data packets" and the respective flow(s) is referred to hereinafter as an "upstream flow(s)". Data packets flowing through the latency measurement module from VM(s) are referred to hereinafter as "arriving data packets" and the respective flow(s) is referred to hereinafter as a "downstream flow(s)". For purpose of illustration, VF mapping unit 217 is presented as upstream VF mapping unit 217-1 configured to map departing data packets 310 and downstream VF mapping unit 217-2 configured to map arriving data packets 311. Unless the context suggests otherwise, any or both of VF mapping units 217-1 and 217-1 are referred to hereinafter as VF mapping unit 217.

Configuration control of VF mapping unit 217 is provided by VMM 207 to enable, inter alia, VF mapping in accordance with VF configuration specifying I/O virtualization in virtualized network interface layer 211.

VMM can obtain data indicative of virtual Ethernet ports of interest for latency monitoring from virtual infrastructure manager (VIM) 154. Optionally, VIM can request VMM to monitor latency of a certain VNF associated with certain virtual functions, and VMM, in turn, can identify respective ingress and egress ports of respective VMs, and set the corresponding VFs to be monitored. Likewise, VMM can set VFs to be monitored in accordance with VLAN(s) corresponding to applications or interest, etc.

Upon setting virtual Ethernet port(s) and corresponding VFs for latency monitoring, VMM can further configure latency measurement module 216 and define monitoring configuration specifying $T_x$ and $R_x$ monitoring points for respective virtual Ethernet ports.

For purpose of illustration only, the following description is provided for latency measurements in a data path corresponding to packets forwarded by a single VM 202. Those skilled in the art will readily appreciate that the teachings of the presently disclosed subject matter are, likewise, applicable to a data path corresponding to the packets forwarded by a chain of VMs.

VF mapping unit 217 transmits data packets associated with VF indicators corresponding to monitoring configuration to latency measuring unit 218. Optionally, the rest of the data packets can be transmitted in due course by-passing the latency measuring unit 218.

Latency measuring unit 218 comprises upstream SG generator 301, downstream SG generator 302, and local time counter 303, all operatively coupled to latency measuring engine 304 comprising SG-TS unit 305 operatively coupled to look-up engine 306. Upstream VF mapping unit 217-1 and upstream SG generator 301, belong to upstream packet processing pipeline. Downstream VF mapping unit 217-2 and downstream SG generator 301 belong to downstream packet processing pipeline. Local time counter 303 and latency measuring engine 304 belong to both upstream and downstream packet processing pipeline.

Upstream SG generator 301 and downstream SG generator 302 are configured to generate signatures (SGs) for at least part of data packets they receive. A packet signature is uniquely indicative of a part of data packet which is unlikely to be changed during an expected packet processing. An ingress packet and an egress packet with the same signature are assumed to be the same packet before and after respective processing.

By way of non-limiting example, SG generators can generate a packet SG as one or more hash functions related to the packet. A hash function can be generated by extracting a portion of data bytes b(p) from the received packet p, and feeding the extracted portion to a hash function h(x) as the input. Hash function h(x) can map the byte sequence b(p) into an integer in [0, A−1], where A is a positive integer. The byte length of the output is L=(log$_2$ A)/8. Thus, the hash output can have much smaller byte length than the whole packet or the extracted portion and still include sufficient information to identify the packet. By way of non-limiting example, generating of packet SGs using hash functions is detailed in "Passive Packet Loss Monitoring That Employs The Hash-Based Identification Technique", Satoru Ohta et al., Ninth IFIP/IEEE International Symposium on Integrated Network Management, 2005.

It is noted that SG generators can be unable to generate SG for some data packets (e.g. because of their insufficient size). Such packets can be excluded from further consideration by the latency measuring unit and can be transparently transferred to respective destination virtual ports.

Upstream VF mapping unit 217-1 can be configured to transmit to latency measuring unit 218 only departing data packets associated with VF indicators corresponding to monitoring configuration (such data packets are referred to hereinafter as eligible for monitoring). Non-eligible for monitoring data packets can be transmitted to respective VFs (or PF, when relevant) by-passing the latency measuring unit 218.

Upstream SG generator is further configured to transfer SG$_D$ generated to a given eligible departing data packet to SG-TS unit 305, and the SG$_D$ is transferred together with upstream VF indicator associated with the packet. Local time counter 303 is configured to sample the given departing packet before its departure from latency measurement module 216 and to transfer to SG-TS unit 305 a departure time stamp (TS) T$_D$ indicative of departure time of the given packet from respective monitoring point T$_x$. SG-TS unit 305 is configured to generate and store a record with respect to the given departing data packet; the record comprises data informative of received SG$_D$ in association with respective VF indicator and with the time stamp received from local time counter 303. The record can further comprise data from a transport header of the given packet (e.g. packet length, source, destination, etc.) and, optionally, application header (or a part thereof) of the given packet. The generated records can be stored in SG-TS data structure (not shown) comprised in the SG-TS unit 305.

Optionally, upstream SG generator can be configured to generate SG$_D$ s and/or latency measuring engine can be configured to generate and store the records for a part of the departing data packets in accordance with a predefined downscale ratio (e.g. for each 100$^{th}$ packet in upstream data flow) and/or in accordance with a predefined protocol (e.g. for TCP traffic only) and/or otherwise predefined conditions.

Downstream SG generator is further configured to transfer SG$_A$ generated to a given arriving data packet to look-up engine 306, and the SG$_A$ is transferred together with the VF indicator associated with the given arriving packet.

Look-up engine 306 is configured to search the SG-TS data structure for a record related to departing data packet which matches the arriving packet. Optionally, look-up engine can provide such a search for each arriving packet. Matching conditions depend on monitoring configuration provided by VMM. Optionally, monitoring configuration can specify a monitoring (T$_x$, R$_x$) pair as a pair constituted by Tx of interest and any Rx. In such a case, matching event occurs when SG$_D$=SG$_A$ (regardless of VF indicator of arriving packet). Alternatively, monitoring configuration can specify a monitoring (T$_x$, R$_x$) pair as a pair constituted by T$_x$ of interest and R$_x$ of interest. In such a case, matching event occurs when SG$_D$=SG$_A$ whilst VF indicators associated with respective departing and arriving packets correspond to the pair (T$_x$, R$_x$).

Local time counter 303 is further configured to sample the given arriving packet on its arrival at latency measurement module 216 and to transfer to look-up engine 306 an arrival time stamp T$_A$ indicative of arrival time of the given arriving packet to respective monitoring point R$_x$.

In a matching event, when the record related to departing data packet matching to arriving data packet SG$_D$ is found, latency measuring engine 304 calculates the difference ΔT between T$_A$ and T$_D$, this difference indicative of real-time measured latency of forwarding the respective packet between respective ingress and egress virtual ports of VM or VM chain. The look-up engine is further configured to modify the found record by including therein ΔT and/or T$_A$, and to export the modified record to outcome data structure 307. Optionally, the modified record can also include downlink VF indicator associated with the matching arriving packet.

The outcome data structure 307 can be configured as a cyclic buffer (FIFO) readable by VMM in pull and/or push mode (periodically, continuously, responsive to a triggering event, etc.). VMM 207 can accommodate and process data received from the outcome data structure, thereby obtaining latency statistics for any of monitored pairs of VFs. The obtained statistic can be further usable by VMM for obtaining latency statistic on virtual machines, VNFCs, VNFs, etc. VMM can further report the latency-related data to VIM (e.g. as a part of IPFIX (Internet Protocol Flow Information Export) reporting). Optionally, latency measuring unit can further comprise a statistic engine (not shown), providing all or part of statistical processing on behalf of VMM.

Those versed in the art will readily appreciate that the teachings of the presently disclosed subject matter are not bound by functional block diagrams illustrated in FIGS. 2a, 2b and 3. Equivalent and/or modified functionality can be consolidated or divided in another manner and can be implemented in any appropriate combination of software, firmware and hardware. By way of non-limiting example, the disclosed functions of network virtualization interface layer and/or of latency measurement module or parts thereof can be implemented in FPGA (Field-Programmable Gate Array) or ASIC (Application-Specific Integrated Circuit).

Figure 4:
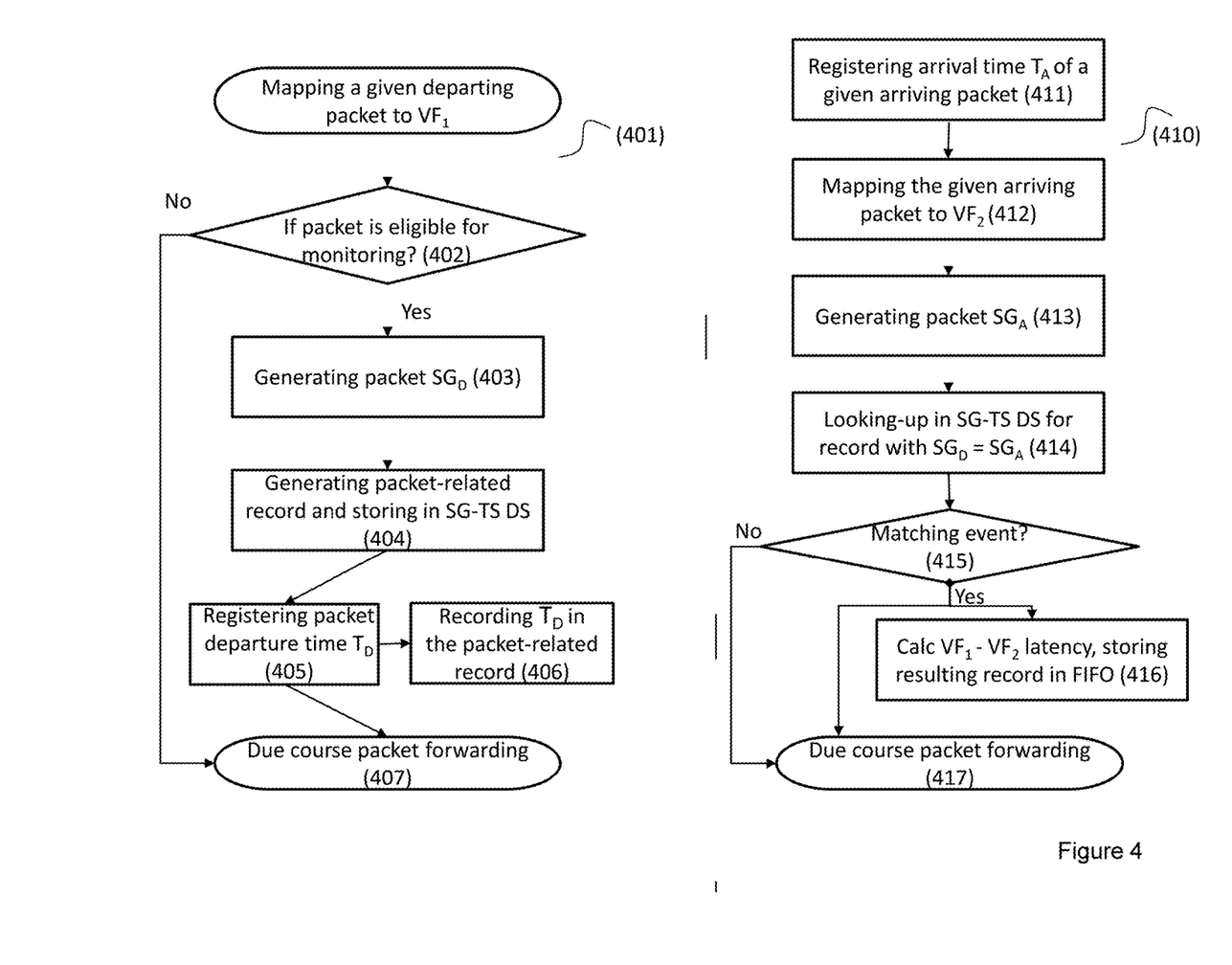
FIG. 4 illustrates generalized flow-charts of operating upstream and downstream packet processing pipelines implemented in the latency measurement module in accordance with certain embodiments of the presently disclosed subject matter.

Referring to FIG. 4, there are illustrated generalized flow charts of operating the upstream and the downstream packet processing pipelines implemented in the latency measurement module in accordance with certain embodiments of the presently disclosed subject matter.

As illustrated with reference to upstream pipeline (401), a mapped-to-VF departing packet is checked (402) for eligibility for monitoring, wherein the eligibility is defined in accordance with monitoring configuration defined by VMM for departing packets.

All eligible departing packets (or part thereof corresponding to a downscale ratio) are forwarded to next upstream pipeline operations which include generating SG$_D$ of a given eligible departing packet (403), and generating (404) a packet-related record comprising data informative, at least, of the generated SG$_D$, associated VF indicator and the header of the given packet. The packet is sampled at the departure from the pipeline, and packet departure time $T_D$ is registered (405) and recorded (406) in the generated packet-related record. Departing packets non-eligible for monitoring as well as sampled packets are further forwarded (407) in due course. The packet-related records can be stored in SG-TS data structure. A non-limiting example of a fragment of SG-TS data structure is illustrated in Table 1. Optionally, corresponding to a downscale ratio, only part of the generated records can be stored in SG-TS data structure.

TABLE 1

| Index (Hash result) | Time stamp, usec | Source IP | Dest IP | DSCP | Protocol | Total Len | Dest Port | Source Port |
|---|---|---|---|---|---|---|---|---|
| 1002 | 3100003 | 10.0.0.1 | 192.168.178.158 | 0 | UDP | 82 | 319 | 319 |
| 1003 | 3101034 | 10.0.0.1 | 192.168.178.158 | 0 | UDP | 72 | 319 | 319 |

As further illustrated with reference to downstream pipeline (410), a given arriving packet is sampled once it has arrived at the pipeline, packet arrival time $T_A$ is registered (411), and the packet is mapped to respective VF. Further, operation of generating (413) $SG_A$ of the given arriving packet is followed by looking-up (414) SG-TS data structure for a record related to a matching departing packet, and calculating (416) $\Delta T = T_A - T_D$ in a case of a matching event (415). The found record is modified to comprise also $\Delta T$ and/or $T_A$ (and, optionally, downstream VF indicator) and stored (417) in an output data structure. A non-limiting example of a fragment of the output data structure is illustrated in Table 2.

TABLE 2

| Time stamp | Rx VF | Latency, usec | Source IP | Dest IP | DSCP | Protocol | Total Len | Dest Port | Source Port |
|---|---|---|---|---|---|---|---|---|---|
| 3500344 | 2 | 3 | 10.0.0.1 | 192.168.178.158 | 0 | UDP | 82 | 319 | 319 |
| 4200341 | 2 | 5 | 10.0.0.1 | 192.168.178.158 | 0 | UDP | 72 | 319 | 319 |

The output data structure (DS) can be configured in FIFO mode with overwriting stale data when necessary. Upon storing a record in the output data structure, the respective record in SG-TS data structure can be deleted or marked as invalid. Optionally, SG-TS data structure can be further configured to invalidate records with accommodation time exceeding a predefined (or dynamically definable) threshold (e.g. 10 or 100 microseconds). It is noted that the matching record shall be a valid record in SG-TS data structure.

It is noted that in accordance with certain embodiments of the presently disclosed subject matter, the output DS can comprise latency-indicative data measured for any arriving packet matching to monitoring-eligible departure packet, such data to be stored in association with respective upstream and downstream VF indicators. Alternatively, the output DS can comprise only latency-indicative data measured for monitoring-eligible pairs of upstream and downstream VFs, such data stored in association with data indicative of respective pair (e.g. pair serial number, upstream VF indicator, etc.).

Figure 5:
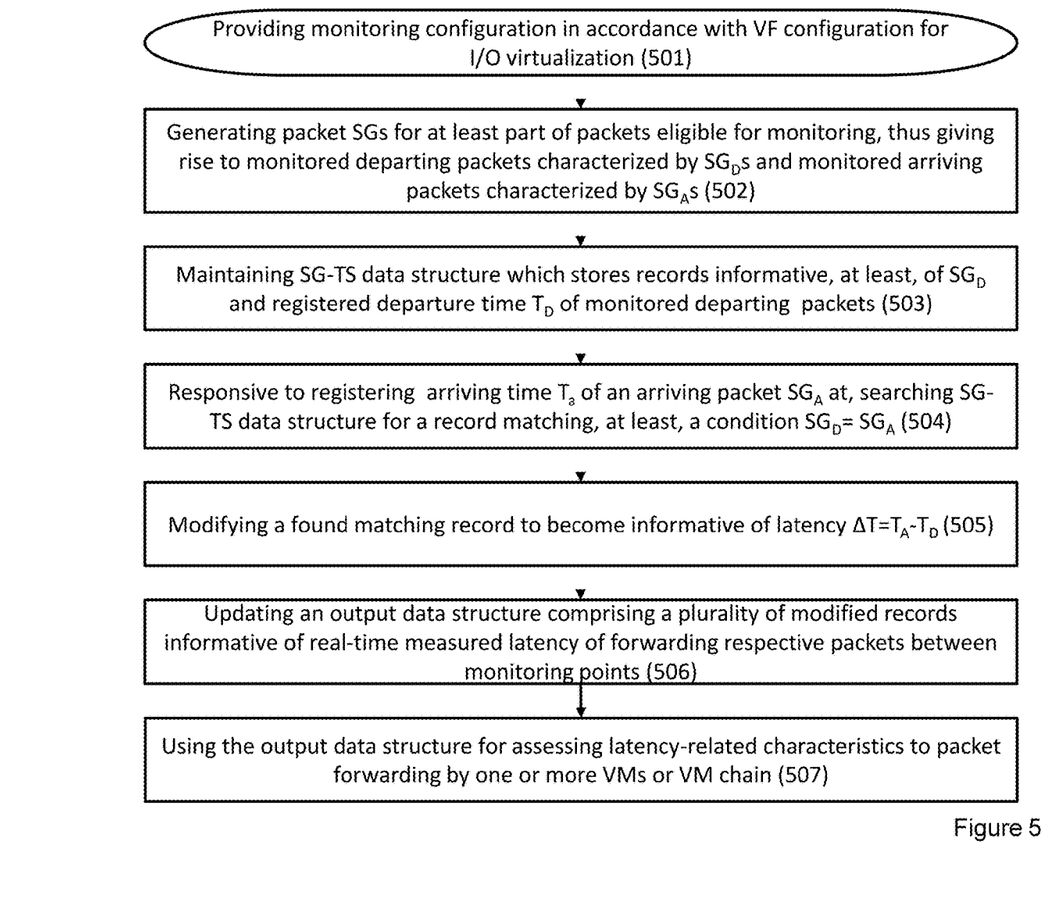
FIG. 5 illustrates a generalized flow-chart of assessing latency of data-packets-forwarding using passive real-time measuring in accordance with certain embodiments of the presently disclosed subject matter.

Referring to FIG. 5, there is illustrated a generalized flow-chart of assessing latency of data-packets-forwarding using passive real-time measuring in accordance with certain embodiments of the presently disclosed subject matter.

Upon receiving (e.g. from VIM) specification indicative of applications, VNFs and/or VNFCs requiring latency-related monitoring, VMM sets (501) latency-monitoring configuration in accordance with VF configuration for I/O virtualization. Setting latency monitoring configuration includes specifying, in accordance with the received specification, $T_x$ and $R_x$ monitoring points for virtual Ethernet ports of one or more virtual machines or a chain thereof. Following the specified monitoring configuration, NIM generates (502) packet SGs for at least part of data packets eligible for monitoring, thus giving rise to monitored departing data packets, each uniquely characterized by respective $SG_D$ and to monitored arriving data packets each uniquely characterized by respective $SG_A$. As was detailed with reference to FIGS. 2-4, NIM maintains (503) SG-TS data structure which stores records related to monitored departing packets, each stored record informative, at least, of $SG_D$ and associated therewith $VF_D$ indicator and registered departure time $T_D$. $VF_D$ indicator is indicative of virtual function associated with VM's ingress virtual Ethernet port being destination of respective departing packet. Departure time $T_D$ is registered by NIM and is indicative of departure time of the packet from respective monitoring point $T_x$. Each record can further comprise data derived from a transport header of respective departing packet (e.g. packet length, source, destination, etc.) and, optionally, derived from application header of the given packet or other data derived by deep packet inspection.

Responsive to arriving therein a given arriving packet $SG_A$ and registering arriving time $T_A$, NIM searches (504) SG-TS data structure for a record matching a matching condition. Arriving time $T_A$ is registered by NIM and is indicative of arriving time of the packet at respective monitoring point $R_x$. The matching condition at least comprises requirement that $SG_D = SG_A$. Optionally, the matching condition can further comprise a requirement that $VF_1$ indicator associated with departing packet $SG_D$ and $VF_2$ indicator associated with arriving packet $SG_D = SG_A$ correspond to one of monitoring pairs $(T_x, R_x)$ defined by the monitoring configuration. It is noted that discovering packets with $SG_D = SG_A$ but with VF indicators mismatching the specified monitoring pair(s) can be indicative of misconfiguration either of a data path or of a monitoring point.

After respective matching record is found, NIM modifies (505) the found record to become informative of $\Delta T = T_A - T_D$. This real-time measured latency of forwarding the packet $SG_D = SG_A$ between monitoring points $(T_x, R_x)$ is indicative of latency of forwarding the packet $SG_D = SG_A$ from ingress virtual port to egress virtual ports of VM or VM chain.

NIM further adds (506) the modified record to an output data structure comprising a plurality of modified records, each informative of latency measured for respective packets. The output data structure is usable (507) for assessing latency-related characteristics of forwarding packets by one or more VM and/or VM chains. Hence, VMM can further assess latency-related characteristics for traffic corresponding to certain monitored applications, VNFs and/or VNFCs.

Figure 6:
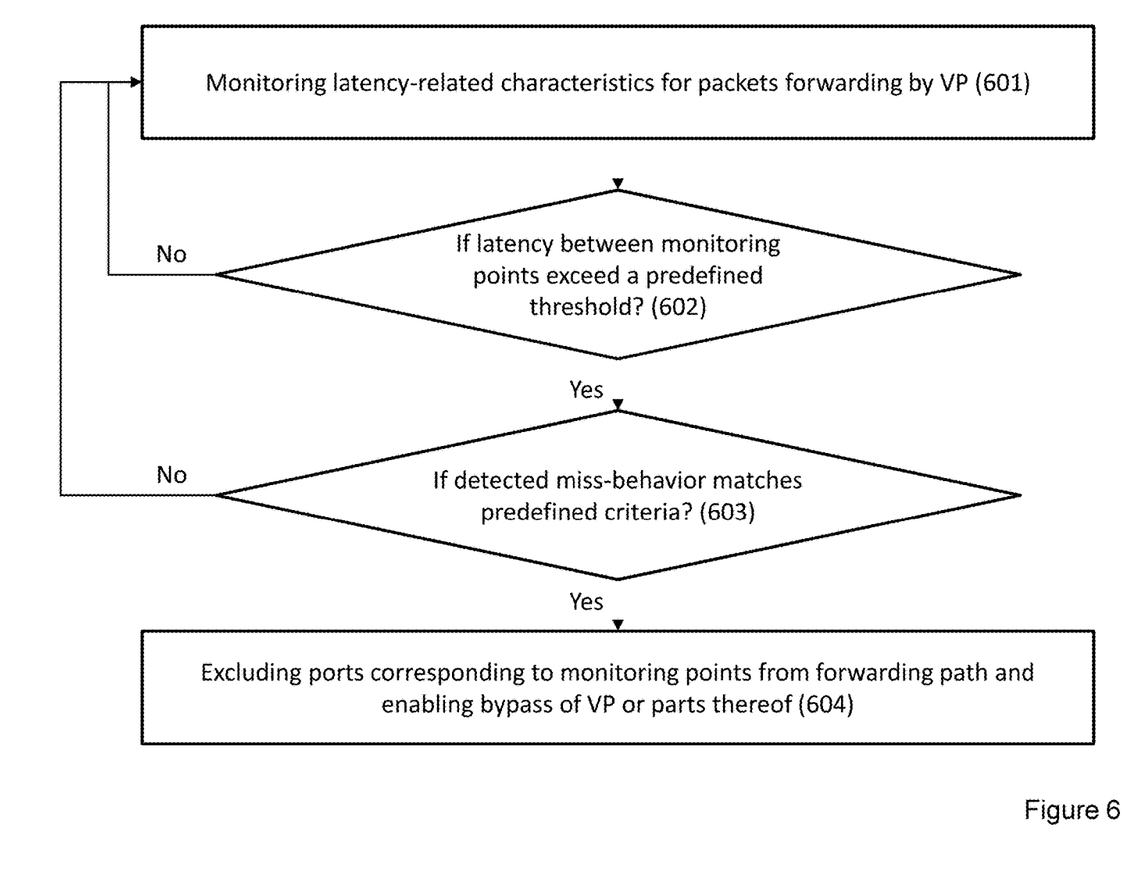
FIG. 6 illustrates a generalized flow-chart of non-limiting example of using the assessed latency of data-packets-forwarding in accordance with certain embodiments of the presently disclosed subject matter.

Referring to FIG. 6, there is illustrated a generalized flow-chart of non-limiting example of using the assessed latency of data-packets-forwarding in accordance with certain embodiments of the presently disclosed subject matter.

For purpose of illustration only, the following description is provided for Virtual Machine (VM) 202 illustrated in FIGS. 2-3. Those skilled in the art will readily appreciate that the teachings of the presently disclosed subject matter are, likewise, applicable any other suitable virtualized platform. Monitoring is provided between $T_x$ and $R_x$ monitoring points corresponding to virtual Ethernet ports of interest. It is noted that virtual Ethernet ports of interest can be ingress and egress ports of the VP. Alternatively or additionally, in a case of VP constituted by more than one VM or virtualized container, monitoring points can correspond to ingress and egress ports of a single virtual machine or a single virtualized container or of a chain (or a part thereof) of virtual machines and/or virtualized containers.

Upon setting latency-monitoring configuration in accordance with VF configuration for I/O virtualization, VMM can monitor (601), in a manner described above, latency-related characteristics of packet forwarding by VM 202. Monitoring is provided at monitoring points 220 and 221 corresponding to virtual Ethernet ports 205 and 206. An event when the monitored latency exceeds (602) a predefined threshold is considered by VMM as indicative of misbehavior of respectively monitored VM. When the detected misbehavior matches (603) a predefined criteria (e.g. time of misbehavior exceeds a predefined time, number of VM restarts exceeds a predefined number, etc.), VMM excludes (604) ports 205 and 206 corresponding to the monitoring points 220 and 221 from the forwarding path and respectively configures Virtualized Network Interface Layer 211 or VF mapping unit(s) 217 thereby enabling bypass of VM by short-cutting the monitoring points.

Optionally, in a case of monitoring latency of a VM chain, VMM can vary settings of monitoring points and repeat operations (601)-(603) to locate VM(s) to be bypassed prior to operation 604.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of assessing latency of forwarding data packets in virtual environment, the method implemented on a computing platform and comprising:
   upon specifying a transmitting monitoring point associated with a first virtual function (VF) corresponding to an ingress virtual port of a virtualized platform (VP) running on the computing platform and a receiving monitoring point associated with a second VF corresponding to an egress virtual port of a virtualized platform (VP) running on the computing platform, generating packet signatures (SGs) for at least part of data packets eligible for monitoring, thus giving rise to monitored departing packets, each uniquely characterized by respective departing packet signature $SG_D$ and to monitored arriving packets each uniquely characterized by respective arriving packet signature $SG_A$;
   maintaining a first data structure comprising a plurality of records related to monitored departing packets associated with the first VF, each record among the plurality of records further informative of, at least, $SG_D$ and registered departure time $T_D$ of a given departing packet, wherein departure time $T_D$ is indicative of departure time of the given departing packet from the first monitoring point $T_x$;
   responsive to registering arriving time $T_A$ of a given monitored arriving packet $SG_A$ associated with the second VF, searching the first data structure for a record matching a matching condition, wherein the matching condition at least comprises requirement that $SG_D=SG_A$, and wherein arriving time $T_A$ is indicative of arriving time of the given arriving packet at the receiving monitoring point;
   modifying the matching record, when found, to become informative of latency $\Delta T=T_A-T_D$ and adding the modified matching record to a second data structure storing one or more modified records, each informative of latency measured for forwarding a respective packet from the first monitoring point to the receiving monitoring point; and
   enabling using data in the second data structure for assessing latency of forwarding packets from the ingress virtual port to the egress virtual port of the virtualized platform.

2. The method of claim 1, wherein the records in the first data structure further comprise data derived from transport headers of respective departing packets and/or data derived by deep packet inspection.

3. The method of claim 1, wherein the records in the second data structure further comprise data derived from transport headers of respective departing packets and/or data derived by deep packet inspection.

4. The method of claim 1, wherein assessing latency is provided in consideration of data derived from transport headers of respective departing packets and/or data derived by deep packet inspection.

5. The method of claim 1 further comprising:
   identifying all virtualized platforms involved in data processing related to a certain virtual network function (VNF);
   specifying the transmitting and receiving monitoring points in accordance with identified VPs; and assessing VNF latency-related characteristics using latencies assessed for forwarding packets from the ingress virtual port to the egress virtual port of each of the involved VP.

6. The method of claim 1, wherein the monitoring points are specified as a pair constituted by the transmitting monitoring point associated with a predefined first VF and the receiving monitoring point associated with any second VF.

7. The method of claim 1, wherein the monitoring points are specified as a pair constituted by the transmitting monitoring point associated with a predefined first VF and the receiving monitoring point associated with a predefined second VF.

8. The method of claim 1, wherein the ingress virtual port and the egress virtual port correspond to ingress and egress directions of the same virtual port, and wherein the first virtual function and the second virtual function correspond to ingress and egress directions of the same virtual function.

9. The method of claim 1, wherein the matching condition further comprises a requirement that the given departing packet has departed from the transmitting monitoring point associated with a predefined first VF while the given arriving packet has arrived at the receiving monitoring point associated with a predefined second VF.

10. The method of claim 1, wherein all arriving packets are eligible for monitoring.

11. The method of claim 1, wherein only part of the departing packets is eligible for monitoring, the part is defined by a predefined downscale ratio.

12. The method of claim 1, wherein only departing packets associated with a predefined traffic protocol are eligible for monitoring.

13. The method of claim 1, wherein the virtualized platform is selected from a group constituted of a virtual machine, a virtualized container, a group of virtual machines and/or virtualized containers, a chain of virtual machines and/or virtualized containers.

14. A computing platform comprising a computer configured to run at least one virtualized platform (VP) and a network interface module configured to provide I/O virtualization for the at least one VP, the module comprising at least one physical I/O port and a circuitry configured to:—
   upon specifying a transmitting monitoring point associated with a first virtual function (VF) corresponding to an ingress virtual port of a virtualized platform (VP) running on the computing platform and a receiving monitoring point associated with a second VF corresponding to an egress virtual port of a virtualized platform (VP) running on the computing platform, generate packet signatures (SGs) for at least part of data packets eligible for monitoring, thus giving rise to monitored departing packets, each uniquely characterized by respective departing packet signature $SG_D$ and to monitored arriving packets each uniquely characterized by respective arriving packet signature $SG_A$;
   maintain a first data structure comprising a plurality of records related to monitored departing packets associated with the first VF, each record among the plurality of records further informative of, at least, $SG_D$ and registered departure time $T_D$ of a given departing packet, wherein departure time $T_D$ is indicative of departure time of the given departing packet from the first monitoring point $T_x$;
   responsive to registering arriving time $T_A$ of a given monitored arriving packet $SG_A$ associated with the second VF, search the first data structure for a record matching a matching condition, wherein the matching condition at least comprises requirement that $SG_D=SG_A$, and wherein arriving time $T_A$ is indicative of arriving time of the given arriving packet at the receiving monitoring point;
   modify the matching record, when found, to become informative of latency $\Delta T=T_A-T_D$ and add the modified matching record to a second data structure storing one or more modified records, each informative of latency measured for forwarding a respective packet from the first monitoring point to the receiving monitoring point; and
   enable using data in the second data structure for assessing latency of forwarding packets from the ingress virtual port to the egress virtual port of the virtualized platform.

15. The computing platform of claim 14, wherein the circuitry is further configured to:
   identify all virtualized platforms involved in data processing related to a certain virtual network function (VNF);
   specify the transmitting and receiving monitoring points in accordance with identified VPs; and
   assess VNF latency-related characteristics using latencies assessed for forwarding packets from the ingress virtual port to the egress virtual port of each of the involved VP.

16. The computing platform of claim 14, wherein the monitoring points are specified as a pair constituted by the transmitting monitoring point associated with a predefined first VF and the receiving monitoring point associated with any second VF.

17. The computing platform of claim 14, wherein the monitoring points are specified as a pair constituted by the transmitting monitoring point associated with a predefined first VF and the receiving monitoring point associated with a predefined second VF.

18. The computing platform of claim 14, wherein the ingress virtual port and the egress virtual port correspond to ingress and egress directions of the same virtual port, and wherein the first virtual function and the second virtual function correspond to ingress and egress directions of the same virtual function.

19. The computing platform of claim 14, wherein the matching condition further comprises a requirement that the given departing packet has departed from the transmitting monitoring point associated with a predefined first VF while the given arriving packet has arrived at the receiving monitoring point associated with a predefined second VF.

20. A computing platform comprising a computer configured to run at least one virtualized platform (VP), a network interface card (NIC) configured to provide I/O virtualization for the at least one VP and a latency measurement module operatively connected to the NIC and comprising a circuitry configured to:
   upon specifying a transmitting monitoring point associated with a first virtual function (VF) corresponding to an ingress virtual port of a virtualized platform (VP) running on the computing platform and a receiving monitoring point associated with a second VF corresponding to an egress virtual port of a virtualized platform (VP) running on the computing platform, generate packet signatures (SGs) for at least part of data packets eligible for monitoring, thus giving rise to monitored departing packets, each uniquely characterized by respective departing packet signature SGD and to monitored arriving packets each uniquely characterized by respective arriving packet signature SGA;

maintain a first data structure comprising a plurality of records related to monitored departing packets associated with the first VF, each record among the plurality of records further informative of, at least, SGD and registered departure time TD of a given departing packet, wherein departure time TD is indicative of departure time of the given departing packet from the first monitoring point Tx;

responsive to registering arriving time TA of a given monitored arriving packet SGA associated with the second VF, search the first data structure for a record matching a matching condition, wherein the matching condition at least comprises requirement that SGD=SGA, and wherein arriving time TA is indicative of arriving time of the given arriving packet at the receiving monitoring point;

modify the matching record, when found, to become informative of latency $\Delta T = T_A - T_D$ and add the modified matching record to a second data structure storing one or more modified records, each informative of latency measured for forwarding a respective packet from the first monitoring point to the receiving monitoring point; and enable using data in the second data structure for assessing latency of forwarding packets from the ingress virtual port to the egress virtual port of the virtualized platform.

* * * * *